United States Patent [19]
Amano et al.

[11] Patent Number: 5,040,215
[45] Date of Patent: Aug. 13, 1991

[54] SPEECH RECOGNITION APPARATUS USING NEURAL NETWORK AND FUZZY LOGIC

[75] Inventors: Akio Amano, Higashimurayama; Akira Ichikawa, Musashino, both of Japan; Nobuo Hataoka, Pittsburgh, Pa.

[73] Assignee: Hitachi, Ltd., Tokyo, Japan

[21] Appl. No.: 400,342

[22] Filed: Aug. 30, 1989

[30] Foreign Application Priority Data

Sep. 7, 1988 [JP] Japan ................................. 63-222313

[51] Int. Cl.⁵ ............................................... G10L 7/08
[52] U.S. Cl. ..................................................... 381/43
[58] Field of Search ...................................... 381/41–46; 364/513, 513.5; 382/14–17, 30, 37–38, 39

[56] References Cited

U.S. PATENT DOCUMENTS

| | | | |
|---|---|---|---|
| 3,287,649 | 11/1966 | Rosenblatt | 381/43 |
| 3,610,831 | 10/1971 | Moshier | 381/43 |
| 4,516,215 | 5/1985 | Hakaridan et al. | 381/43 |
| 4,712,243 | 12/1987 | Ninomiya et al. | 381/43 |
| 4,715,004 | 12/1987 | Kabasawa et al. | 364/513.5 |
| 4,805,225 | 2/1989 | Clark | 382/15 |
| 4,876,731 | 10/1989 | Loris et al. | 382/15 |

OTHER PUBLICATIONS

Itakura, "Minimum Prediction Residual Principle Applied to Speech Recognition", IEEE ASSP, vol. ASSP-23, 2/75, pp. 67–72.
Mori et al., "Use of Fuzzy Algorithms for Phonetic and Phonemic Labeling of Continuous Speech", IEEE Trans on Pattern Analysis, vol. PAMI-2, No. 2, 3/80, pp. 136–.

Primary Examiner—Gary V. Harkcom
Assistant Examiner—John A. Merecki
Attorney, Agent, or Firm—Antonelli, Terry, Stout & Kraus

[57] ABSTRACT

A speech recognition apparatus has a speech input unit for inputting a speech; a speech analysis unit for analyzing the inputted speech to output the time series of a feature vector; a candidates selection unit for inputting the time series of a feature vector from the speech analysis unit to select a plurality of candidates of recognition result from the speech categories; and a discrimination processing unit for discriminating the selected candidates to obtain a final recognition result. The discrimination processing unit includes three components in the form of a pair generation unit for generating all of the two combinations of the n-number of candidates selected by said candidate selection unit, a pair discrimination unit for discriminating which of the candidates of the combinations is more certain for each of all $_nC_2$-number of combinations (or pairs) on the basis of the extracted result of the acoustic feature intrinsic to each of said candidate speeches, and a final decision unit for collecting all the pair discrimination results obtained from the pair discrimination unit for each of all the $_nC_2$-number of combinations (or pairs) to decide the final result. The pair discrimination unit handles the extracted result of the acoustic feature intrinsic to each of the candidate speeches as fuzzy information and accomplishes the discrimination processing on the basis of fuzzy logic algorithms, and the final decision unit accomplishes its collections on the basis of the fuzzy logic algorithms.

12 Claims, 10 Drawing Sheets

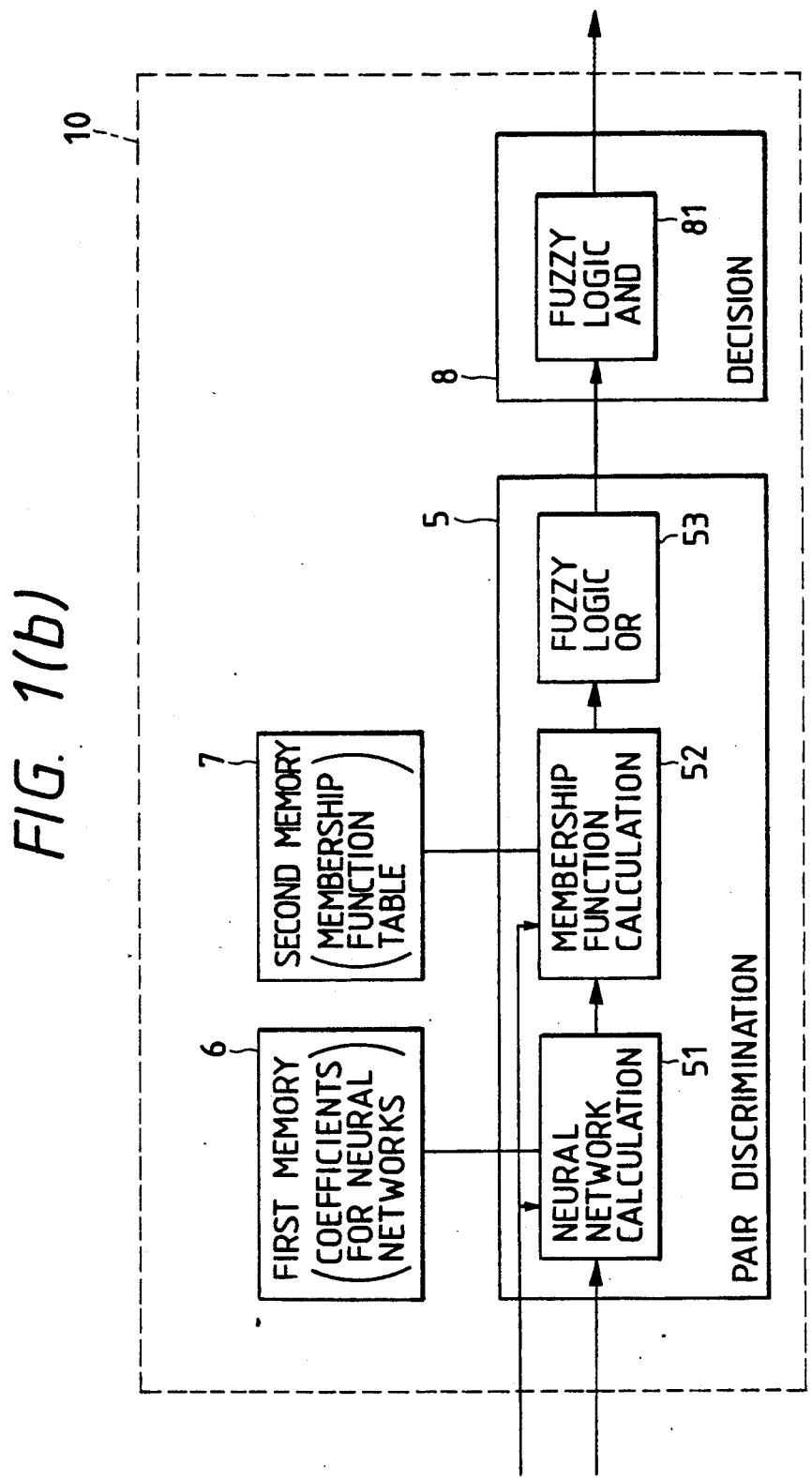

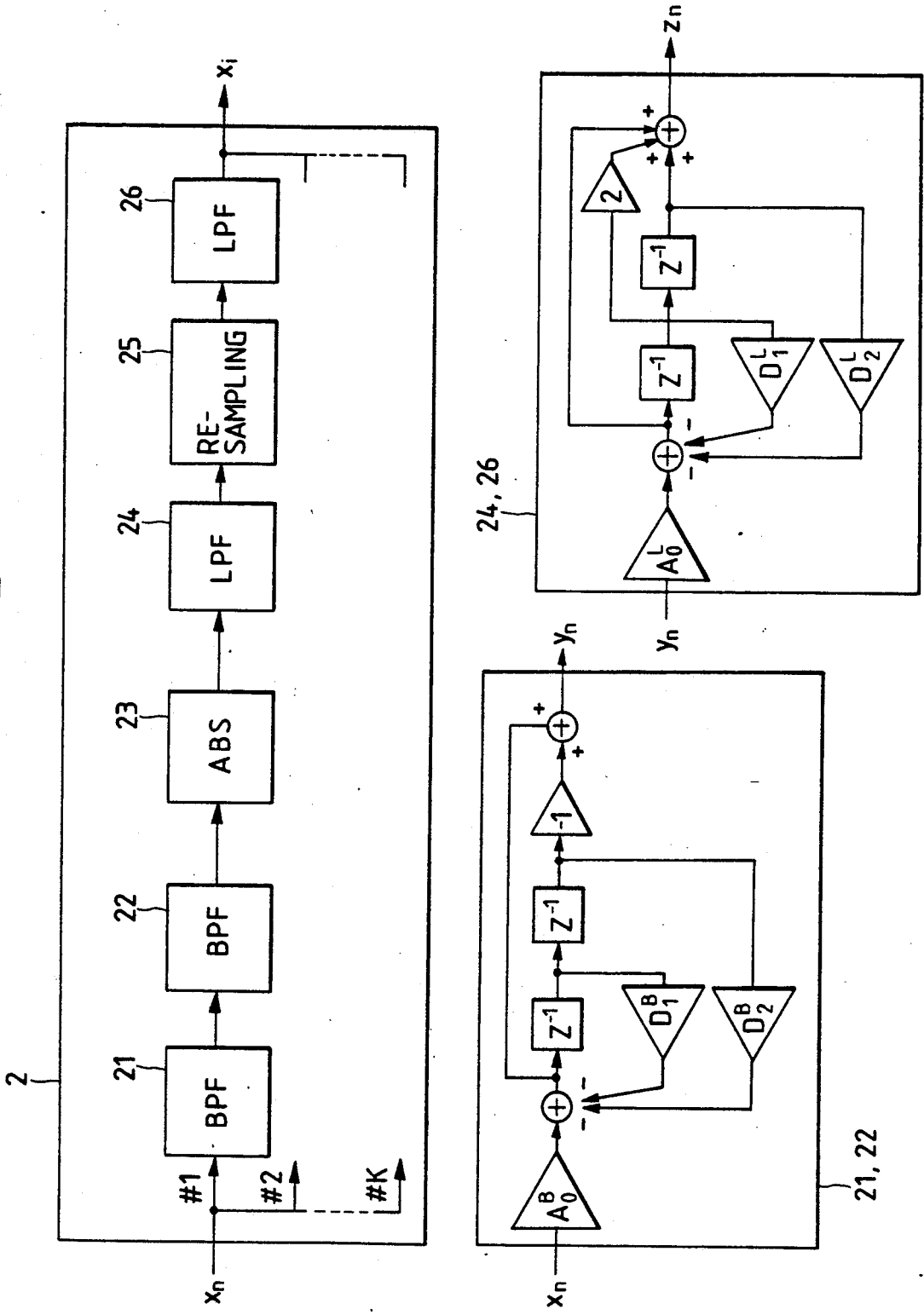

FIG. 5

| | | | TYPE |
|---|---|---|---|
| 1 | BUZ | EXISTENCE OF BUZ-BAR | a, |
| 2 | NAS | EXISTENCE OF NASAL MURMUR | a, |
| 3 | FRIC | EXISTENCE OF FRICATIVE | a, |
| 4 | LTRL | EXISTENCE OF | a, |
| 5 | ASPR | EXISTENCE OF ASPIRATION | a, |
| 6 | LENG | LENGTH OF PHONEME DURATION | b |
| 7 | TRNS | EXISTENCE OF TRANSITION | b |
| 8 | F2TRSU | RISING OF SECOND FORMANT | b |
| 9 | F2TRSD | FALLING OF SECOND FORMANT | b |
| 10 | F2TRSS | | |
| 11 | PLOS | EXISTENCE OF PLOSIVE FEATURE | c |
| 12 | BRSTCM | COMPACTNESS OF BURST SPECTRA | d |
| 13 | BRSTDR | DIFFUSE RISING FEATURE OF BURST SPECTRA | d |
| 14 | BRSTDF | DIFFUSE FALLING FEATURE OF BURST SPECTRA | d |
| 15 | VOT | LENGTH OF VOICE ONSET TIME | a |
| 16 | ONSET | ABRUPT ONSET OF POWER | c |
| 17 | PAUSE | EXISTENCE OF PAUSE INTERNAL | e |
| 18 | DIP | EXISTENCE OF POWER DIP | e |
| 19 | CONT | CONTINUITY OF FEATURE VECTOR SERIES | b |
| 20 | TRATE | SPEED (RATE) OF TRANSITION | b |

FIG. 9

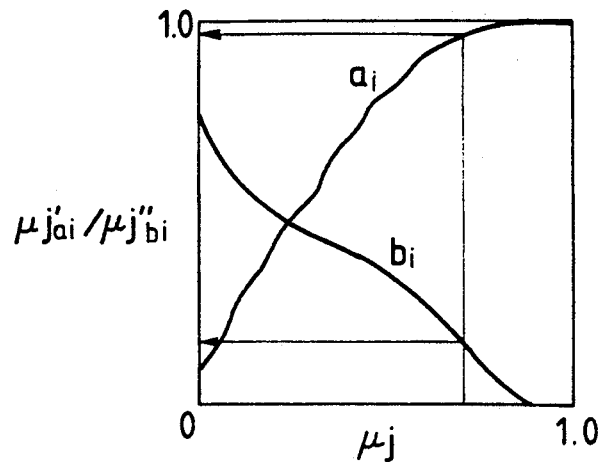

FIG. 10

| $b_i$ \ $a_i$ | p | t | k | b | | | n | r |
|---|---|---|---|---|---|---|---|---|
| p | — | $\mu p/t$ | $\mu p/k$ | $\mu p/b$ | | | $\mu p/n$ | $\mu p/r$ |
| t | $\mu t/p$ | — | $\mu t/k$ | $\mu t/b$ | | | $\mu t/n$ | $\mu t/r$ |
| k | $\mu k/p$ | $\mu k/t$ | — | $\mu k/b$ | | | $\mu k/n$ | $\mu k/r$ |
| b | $\mu b/p$ | $\mu b/t$ | $\mu b/k$ | — | | | $\mu b/n$ | $\mu b/r$ |
| d | $\mu d/p$ | $\mu d/t$ | $\mu d/k$ | $\mu d/b$ | | | $\mu d/n$ | $\mu b/r$ |
| | | | | | | | | |
| n | $\mu n/p$ | $\mu n/t$ | $\mu n/k$ | $\mu n/b$ | | | — | $\mu n/r$ |
| r | $\mu r/p$ | $\mu r/t$ | $\mu r/k$ | $\mu r/b$ | | | $\mu r/n$ | — |

SPEECH RECOGNITION APPARATUS USING NEURAL NETWORK AND FUZZY LOGIC

BACKGROUND OF THE INVENTION

The present invention relates to a speech recognition system and, more particularly, to an apparatus for satisfactorily recognizing speech which is featured by versatile and fuzzy characteristics.

The speech recognition apparatus of the prior art adopts a system, in which standard patterns are prepared for all the categories of speech to be recognized so that an input pattern having the most similarity may be used as the recognized result by referring it to each of the standard patterns, IEEE, Trans. on ASSP - 23, No. 1 (1975) pp. 67 to 72.

In this system, the recognizing operations are based upon the reference to the standard pattern. Since, however, features of speech are implicitly incorporated into the standard pattern, the propriety of the intermediate procedures of the recognitions cannot be decided by a person. Thus, the improvements in the performance of the recognition apparatus are obtained only by a trial and error method so that knowledge cannot be accumulated to improve the performance systematically.

In order to solve this problem, the present applicant has proposed, in U.S. Pat. application Ser. No. 129,994 (filed on Dec. 8, 1987 now abandoned), a system which comprises: means for holding for each of the features intrinsic to the individual phonemes the names and procedures of processings for examining whether or not the features intrinsic to the individual phonemes exist in the time series of the feature pattern; and a table written with both the names of said processings for discriminating two of the combinations of all the categories of the speech to be recognized and the manners of interpreting the processed results so that the recognition processings may be accomplished by the pair discrimination according to the descriptions of said table. In order to determine the causes for a mistaken recognition, according to this method, the mistaken one of the pair discrimination results may be examined. The performance can be improved without adversely affecting the remaining pair discrimination results by improving those processing procedures.

However, this system fails to give adequate consideration to the fuzziness intrinsic in speech (e.g., the uncertainty on the operations of a sound-making organ, the fuzziness in the speaking attitude of a speaker or the fuzziness due to the structure deformation in the intonations) or the technical restrictions such as the shortage of the analytical resolution. In order to constitute the most proper pair discrimination for all the two combinations from the total phonemic categories their characteristics have to be analyzed one by one to determine the processing method so that a long time has to be taken for the development of the processing.

In the meanwhile, there has been proposed a speech recognition system which incorporates fuzzy logic so that it is suited for the fuzzy information, as is disclosed in D, Vol. J70-D, No. 10, pp. 1890 to 1901 (1987. 10) and R. De. Mori et al. "Use of Fuzzy Algorithms for Phonetic and Phonemic Labeling of Continuous Speech" IEEE Trans. on PAMI, Vol PAMI-2, No. 2, pp. 136–148 (1980). This system is based upon tree search so that each of various logic discriminations are not independent. The remaining problem is that the aforementioned processings are not independent so that the performance improvements are difficult to accumulate.

SUMMARY OF THE INVENTION

An object of the present invention is to provide a speech recognition apparatus which can warrant the independency of the individual processings, while considering the fuzziness intrinsic in speech, and can realize the performance improvements systematically to achieve recognition with high performance.

A second object of the present invention is to provide a speech recognition apparatus which can automatically learn and determine the processing method which is optimum for each speech.

The above-specified first object is achieved by providing a speech recognition apparatus having a speech input unit for inputting speech; a speech analysis unit for analyzing the inputted speech to output a time series of a feature vector; a candidates selection unit for inputting the time series of feature vector from the speech analysis unit to select a plurality of candidates of recognition result from the speech categories; and a discrimination processing unit for discriminating the selected candidates to obtain a final recognition result. The discrimination processing unit includes as its three components a pair generation unit for generating all of the combinations of the two candidates from a selected n-number of candidates selected by the candidate selection unit; a pair discrimination unit for discriminating which of the candidates of the combinations is more certain for each of all the $_nC_2$-number of combinations (or pairs) on the basis of the extracted result of the acoustic feature intrinsic to each of said candidate speeches; and a final decision unit for collecting all the pair discrimination results obtained from the pair discrimination unit for each of all the $_nC_2$-number of combinations (or pairs) to decide the final result. The pair discrimination unit handles the extracted result of the acoustic feature intrinsic to each of the candidate speeches as fuzzy information and accomplishes the discrimination processing on the basis of fuzzy logic algorithms, and the final decision unit accomplishes its decisions on the basis of the fuzzy logic algorithms.

The second object is also achieved by modifying the structure for the first object such that the extracting processing of the acoustic feature which is intrinsic to the candidate speech is constructed of a neural network having a self-learning capability.

Incidentally, the aforementioned recognition method is constructed to include the pair discrimination unit for deciding which category the input properly belongs to when two arbitrary categories (e.g., phonemes) of all the speeches are selected as candidates; and the final decision unit (or result collection unit) for integrating the results of the individual pair discrimination units to decide what phoneme the input belongs to. In the description thus far made, the pair discrimination units and the final decision unit are based upon the fuzzy logic algorithms, but can be modified in the following manners: (1) The pair discrimination units are constructed of the neural network whereas the synthetic decision unit is based upon the fuzzy logic algorithms; and (2) the pair discrimination units and the final decision unit are constructed of the neutral network.

Here, the neural network is constructed of equivalently parallel processing elements, which are coupled either by self-learning using dynamic self-programing irrespective of the presence of a teacher or in a fixed manner by preliminary learning.

Generally speaking, the neural network is enabled to realize an arbitrary mapping (of input/ output) on principle by increasing the number of structural hierarchies. Moreover, this arbitrary mapping is specifically realized by giving ideal output data corresponding to the input data and learning in accordance with suitable learning algorithms. For an arbitrary input speech, therefore, a membership function capable of expressing the degree of existence of the acoustic feature can be utilized, by giving that feature parameter as the input data and the existence (at a value between 1 and 0 of the fricativeness of the input speech, for example) of the feature to be used for the pair discrimication processing as the output data and learning in accordance with suitable learning algorithms.

It is also possible to construct the pair discrimination units which can receive those acoustic features (such as the plosiveness, fricativeness or nasality) to output the pair discrimination result for which the sound is likely /p/ or /k/. For the learning, in this case, the degree of the features is given, as follows. If the featuring input is /p/, the value 1 is given to the output corresponding to /p/ and the value 0 is given to the output corresponding to /k/. For the featuring input /k/, moreover, the study may be accomplished in the inverted combination.

With this construction, the membership functions indicating the likelihood of /p/ and /k/ are outputted from the pair discrimination units for discriminating the pairs of /p/ and /k/. Similar operations are obtained for the pairs of other phonemes.

Likewise, in case the final decision unit is constructed of a neural network, the output of each pair discrimination unit is used as the input data whereas the category name inputted is used as the output data so that the neural network may be learned to finally decide what category the input speech belongs to.

Here will be described the case in which the pair discrimination units or the final decision unit are to be fuzzy-processed.

If a phenomenon y is observed by a cause x, they are expressed by a fuzzy relation R:

$$y = x \cdot R \qquad (1).$$

In each pair discrimination unit, from the observation value y composed of the membership function of each feature of each pair, the category x or the cause for generating the observation value is inversely estimated. This estimation can be realized by the expansion of the fuzzy logic if the fuzzy relation R is determined. Likewise in the synthetic decision unit, assuming that the certainty of each category of each pair or the output of each pair discrimination unit is the observation value y, the category x causing the generation of the observation value is inversely estimated. This estimation can also be realized by the expansion of the fuzzy logic if the fuzzy relation R is decided.

This fuzzy processing naturally contains not only the estimation by the fuzzy logic but also a similar processing using the fussy logic.

Moreover, the cause x obtained by the inverse estimation according to the fuzzy relation (1) can be solved to attain a plurality of solutions according to the manner of determining the fuzzy relation R or the selection of the inverse estimation procedures. Thus, in case the recognition result is once outputted but the result is improper (or in case there arises a combination of categories (e.g., phonemes) which could not occur for Japanese), another solution can be determined for re-output (called "top-down processing").

Moreover, the cause for the membership function near 0 of the elements composing an estimation cause vector x', which is obtained by inverse estimation using an observation value y' composed of the values prepared by subtracting the values of the membership function of each element of the observation vector y of the fuzzy relation (1) from 1, has a meaning that "it could not be said that the cause is not" (called "inverse estimation"). If, therefore, the recognized result is not coincident with reference to that accepted to be correct, the inverse estimation can be accomplished to confirm whether or not the result accepted to be correct could be possibly obtained.

BRIEF DESCRIPTION OF THE DRAWINGS

FIG. 1(b) is a block diagram showing the detail of the pair discrimination unit and the decision unit of FIG. 1(a);

FIG. 2 is a block diagram showing one embodiment of a spectral analysis unit;

FIG. 5 is a diagram showing an example of the acoustic cue featuring a speech;

FIG. 9 is a diagram for explaining a method of selecting the output of the acoustic cue extraction processor to be used in the pair discrimination unit;

FIG. 10 is a diagram for explaining the structure of the output of the pair discrimination unit;

DESCRIPTION OF THE PREFERRED EMBODIMENTS

Figure 1A:
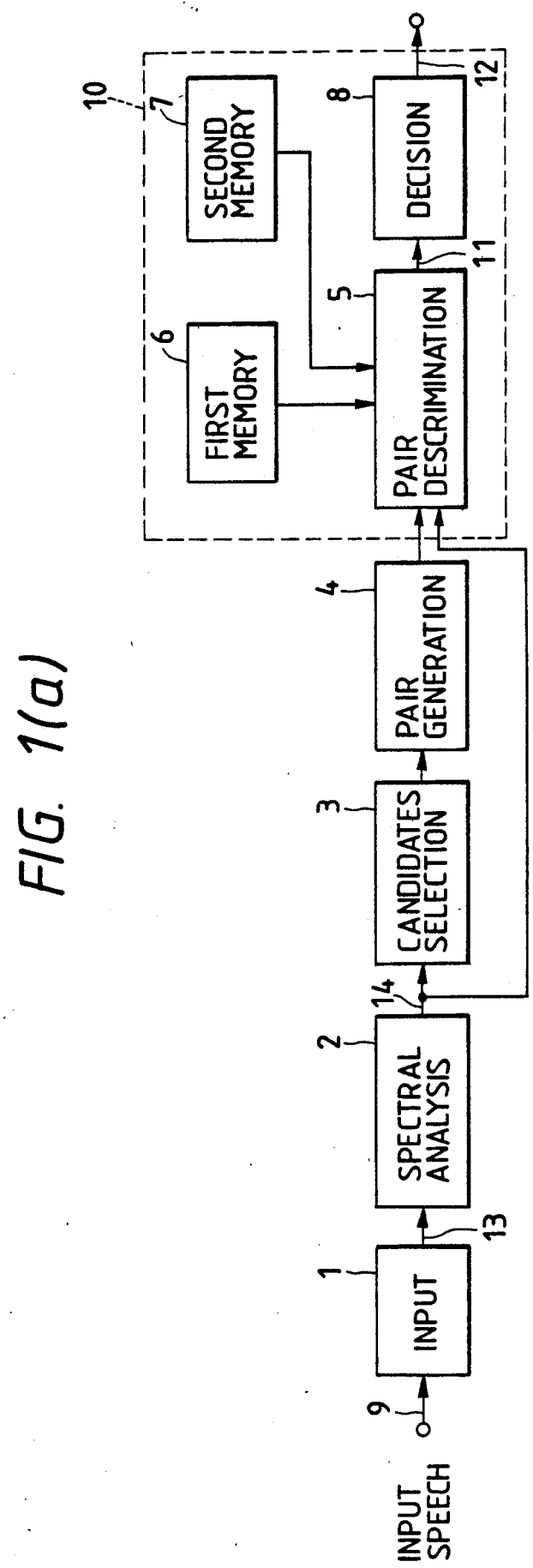
FIG. 1(a) is a block diagram showing the overall structure of one embodiment of the present invention.

The present invention will be described in the following in connection with one embodiment thereof with reference to FIGS. 1(a) and 1(b).

A digitized speech 13 coming from an input unit 1 is converted by a spectral analysis unit 2 into a feature pattern expressing the feature of the speech at a predetermined time interval so that it is outputted as a time series of feature pattern 14. A candidates selection unit 3 receives the time series of feature pattern 14 to output an n-number (e.g., n=5) of more significant candidates of the speech category thought to exist in the input. The n-number of candidates selected by the candidates selection unit 3 are sent to a pair generation unit 4 so that a $_nC_2$-number of pairs (e.g., $_nC_2 = 10$ for n=5) to be subjected to pair discrimination are generated and sent to a pair discrimination unit 5. This pair discrimination unit 5 discriminates each of the $_nC_2$-number of pairs sent from the pair generation unit 4, but the operations of only one pair will be described. If two candidates are categories a and b, the pair discrimination unit 5 first refers to a second memory 7 to examine what is the feature (e.g., plosiveness, fricativeness or buzzbar) intrinsic to the phoneme acting as a cue for discriminating the categories a and b. Now, if there are a K-number of the features (as will be referred to as "acoustic cues") intrinsic to the phoneme for cueing the discrimination of the categories a and b, it is examined whether or not each of the K-number of acoustic cues exists in the time series of feature pattern inputted. In accordance with the present invention, this processing is realized by a neural network.

For the acoustic cue extraction processing, a first memory 6 stores in advance the name of each of the acoustic cues, the type of the neural network for extracting the acoustic cue, and connection coefficients.

If it is found, as described above, with reference to the second memory 7 that there are K-number of acoustic cues for discriminating the categories a and b, the types of the neural networks and the connection coefficients are sequentially sent for the K-number of acoustic cues from the first memory 6 to a neural network calculation unit 51 to extract the acoustic cues. Thus, a result of the extractions of the K-number of acoustic cues is obtained. This extraction result is sent to a membership function calculation unit 52 so that it is transformed into a membership function value. The calculation of this membership function value is accomplished by referring to a transformation table which is prepared in advance for each pair of each category in the second memory 7 for transforming the extracted values of the acoustic cues into the membership functional values. If the extracted value of the k-th acoustic cue is designated at $O_k$ and if the membership function value of the corresponding category a is designated at $\mu_{a/b,k}$ while the membership function value of the category b is designated at $\mu_{b/a,k}$, the processings to be accomplished by the membership function calculation unit 52 can be expressed by:

$$\mu_{a/b,k} = T_{a/b,k}(O_k);$$

and $$\mu_{b/a,k} = T_{b/a,k}(O_k).$$

Here, $T_{a/b,k}$ and $T_{b/a,k}$ designate transformation tables. Thus, the K-number of membership function values for the speech categories a and b, respectively, are sent to a fuzzy logic OR device 53 so that the certainties of the categories a and b are calculated considering their contrasts. If the certainties of the categories a and b considering their contrasts are expressed by $\mu_{a/b}$ and $\mu_{b/a}$, the processings at the fuzzy logic OR device 53 can be expressed by:

$$\mu_{a/b} = \bigvee_{k=1}^{k} \mu_{a/b,k}$$

$$= \max_k \mu_{a/b,k};$$

and $$\mu_{b/a} = \bigvee_{k=1}^{k} \mu_{b/a,k}$$

$$= \max_k \mu_{b/a,k}.$$

By these processings, the certainties $\mu_{a/b}$ and $\mu_{b/a}$ of the categories a and b are determined to end the pair discriminations of the categories a and b. The pair discriminations of all the remaining pairs are accomplished by similar procedures. Thus, the discriminated results 11 of the $_nC_2$-number of pairs are obtained from the pair discrimination unit 5 and are summarized in a decision unit 8. On the basis of this summation, the n-number of candidates are ranked and outputted as a final result 12.

The input unit 1 is constructed, as customary, of a microphone, an analog amplifier and an analog/digital converter and will not need an additional explanation.

The spectral analysis unit 2 may be effected by a filter bank analysis unit or a linear prediction (LPC) device, the former of which is used in the present embodiment, as will be specifically described with reference to FIG. 2. An input speech $x_n$ is inputted to a group of Band Pass Filters (BPFs) 21 and 22 having different center frequencies and band widths. In the present embodiment, the BPF group has a two-stage structure so as to perform a frequency resolution.

The BPFs 21 and 22 are made of quadratic Butterworth type filters, which are constructed of two adders, four multipliers and two delays. The waveform of the BPF results is rectified by an absolute value transformer (ABS) 23 and has its high-frequency components cut by an Low Pass Filter LPF 24, a re-sampling device 25 and an LPF 26 so that an output pattern $x_i$ is obtained. The LPFs are made to have a two-stage structure for effecting a frequency resolution like the BPF, and the LPFs 24 and 26 are of the Butterworth type having a processing scale like the BPFs.

In the present embodiment, the filter bank is exemplified by 16 channels, in which bands of 100 Hz to 6 KHz are logarithmically arranged. The bands and the arrangements of the filters could naturally be modified in various way.

Next, the candidates selection unit 3 will be described in the following.

The candidates selection unit 3 can be exemplified by several methods, but the present embodiment employs the template matching of the prior art, by which the more significant candidates (e.g., an n-number of candidates having the shorter distances) are outputted. The template matching may be exemplified by the method which is disclosed in "Minimum Prediction Residual Principle Applied to Speech Recognition" by F. Itakura et al., IEEE Trans on Acoustics, Speech and Signal Processing, vol. ASSP - 23, pp. 57 to 72, Feb. 1975. In this disclosure, the likelihood ratio is used as distance measure, which may by exemplified in the present embodiment by the Euclidean distance between the feature (or spectral) pattern.

Figure 3:
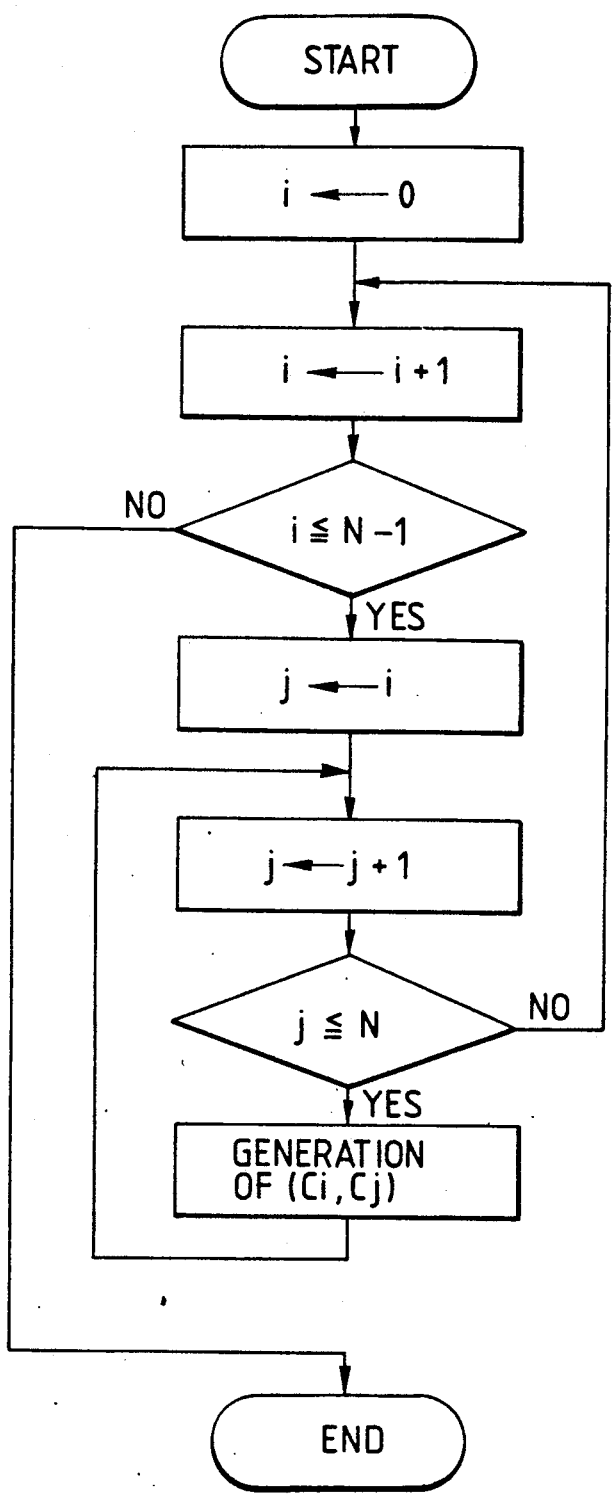
FIG. 3 is a flow chart for explaining the operations of the pair generation unit.

For the n-number of candidates obtained from the candidates selection part 3, the pair generation unit 4 generates an $_nC_2$-number of all pairs of combinations considered. This is such a simple combinatorial algorithm that it can be easily realized by software, as specifically shown as a flow chart in FIG. 3. In FIG. 3, the n-number of speech categories enumerated as the candidates are designated at $C_1, C_2, ---,$ and $C_n$. According to this flow chart, the pairs of the speech categories are generated in the total number of $_nC_2$ in the order of $(C_1, C_2), (C_1, C_3), ---, (C_1, C_n), (C_2, C_3), ---,$ and $(C_{n-1}, C_n)$.

Next, the specific structure of the pair discrimination unit 5 shown in FIG. 1(b) will be described in the following with reference to FIG. 4.

The digitized speech 13 has its frequency analyzed by the spectral analysis unit 2 so that its output channels 10-1 to 10-16 are inputted to the pair discrimination unit 5. In this pair discrimination unit 5, the output of the spectral analysis 2 is added to a group of acoustic cue extraction processors 51. These acoustic cue extraction processors 51 are exemplified by twenty kinds, as shown in FIG. 5, to extract the various cues for expressing the features of the individual phonemes of the speech. Other kinds can be conceived for the cues, and all the cues need not be used but can naturally be combined in various ways for the performances demanded and the languages to be analyzed.

It also goes without saying that the outputs of the acoustic cue extraction processors may be fed as features to the input of the candidates selection unit 3.

The output of each acoustic cue processor 51-i ($1 \leq i \leq n$) is added through a transformation unit 52-j-k ($1 \leq j \leq m, 1 \leq k \leq n$) to a group of pair discrimination units 53-l ($1 \leq l \leq n$). Each pair discrimination unit 53-l ($1 \leq l \leq n$) discriminates which of the phoneme pairs ai and bi the input speech may possibly be, and is prepared for each of the various kinds of pairs. The transformation unit 52 is used to transform the output result of the acoustic cue processor, which is stored in the transformation table in the second memory 7 of FIG. 1, into a value optimum for discriminating each pair discrimination unit 53.

The transformation unit 52 can naturally be eliminated if the acoustic cue processor is provided especially for optimizing each pair discrimination unit. If, on the other hand, the discrimination performance of each pair discrimination unit can be slightly dropped, another modification can naturally be made by eliminating the transformation unit 52. The outputs 11-a, 11-b, ---, 11-$a_m$, and 11-$b_m$ of the individual pair discrimination unit 53 are inputted to the decision unit 8 (as shown in FIG. 1).

Next, the structure of the acoustic cue processor will be described in more detail. Letters a to e appearing in the "type" column of FIG. 5 designate the types of the characteristics of the acoustic cue. The type a has steady characteristics (i.e., Type 1). Of the types b, c and d which are featured (Type 2) to have timely changes within a constant time width: the type b has a transition, the type c has a discontinuity, and the type d has a temporary feature. The type e is characterized (Type 3) in the timely order relations. In the present embodiment, the structures of the acoustic cue extraction processors are classified according to three types and are constructed of neural networks having respectively suitable basic structures. Since the acoustic cues to be extracted are different even for the common type, the individual networks are so independently learned as to produce respectively proper values and naturally have different characteristics.

Figure 6:
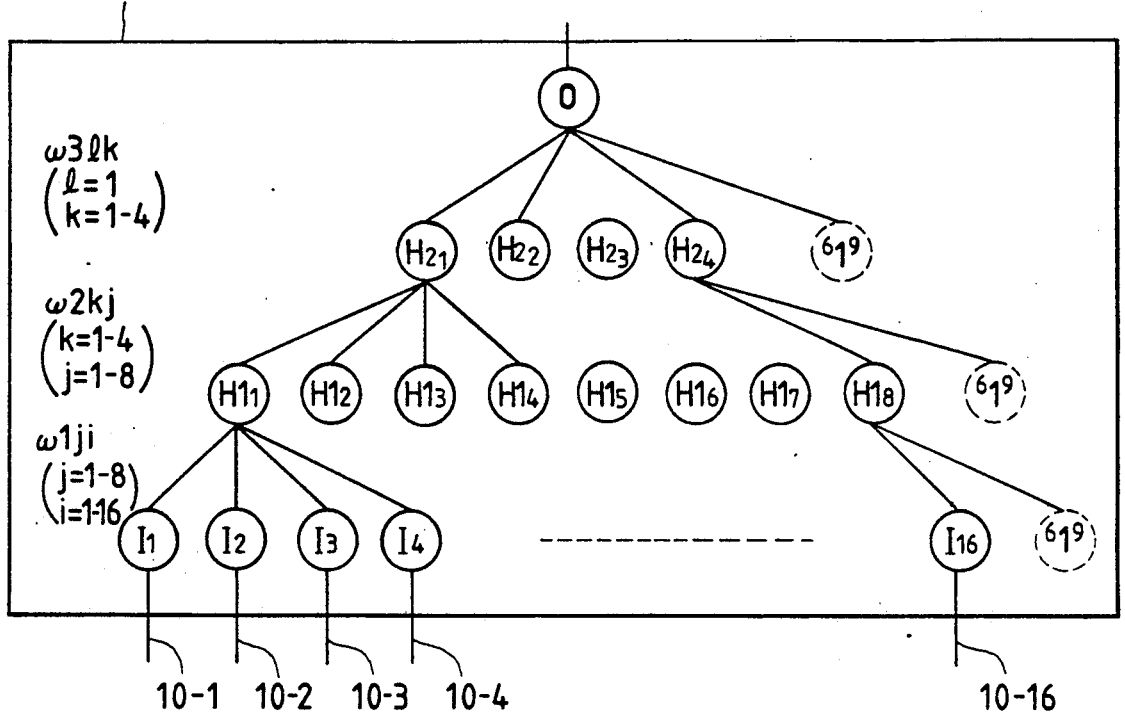
FIGS. 6, 7 and 8 are diagrams for explaining neural networks of three types for realizing an acoustic cue extraction processor.

The acoustic cue extraction processor of the Type 1 is constructed of a hierarchical neural network such as shown in FIG. 6. This network has two hidden layers between the input layer I and the output layer O. This hierarchical neural network is described in detail together with its learning method in "Parallel Distributed Processing" by D. E. Rumelhart et al., MIT Press, Cambridge (1986). The connection coefficient between an input unit $I_i$ and the hidden first layer unit $H_{1j}$ is designated at $w_{1ji}$; the connection coefficient between each unit $H_{1j}$ of the hidden first layer and the each unit $H_{2k}$ of the second layer is designated at $w_{2kj}$; and the connection coefficient between each unit $H_{2k}$ of the hidden second layer and the unit O of the output unit is designated at $w_{3k}$. Moreover, each unit of each layer has its output O constructed, as follows:

$$O_{Ij} = I_i; \qquad (2)$$

$$O_{H1j} = 1/\left[1 + \exp - \left(\sum_{i=0}^{16} w_{1ji} \cdot O_{1j}\right)\right]; \qquad (3)$$

$$O_{H2k} = 1/\left[1 + \exp - \left(\sum_{j=0}^{8} w_{2kj} \cdot O_{H1j}\right)\right]; \qquad (4)$$

and $$O_0 = 1/\left[1 + \exp - \left(\sum_{k=0}^{4} w_{3k} \cdot O_{H2k}\right)\right]. \qquad (5)$$

Here, for $i=0, j=0$ and $k=0$, the unit receives the constant 1 at the righthand end of each layer of FIG. 6, and the threshold values of the individual units are equivalently obtained at $w_{1j0}, w_{2k0}$ and $w_{30}$. This acoustic cue extraction processor outputs, if it is learned to detect the fricativeness, for example, a value at or near 1, when it receives a fricative, but a value at or near 0 in response to other inputs.

Next, the learning procedures will be described in the following. The learning may be accomplished either (1) by constructing the neural network having another but similar structure in advance on a computer or the like, and by extracting a connection coefficient after the learning and introducing it into the corresponding acoustic cue extraction processor; or (2) by disposing such a structure in the apparatus as can perform the following learning procedures. This structure per se can be easily realized by those skilled in the art. Generally speaking, however, long processing periods and mass data have to be prepared for the learning of the neural network so that the data may be inputted for the learning. It is, therefore, more economical to construct the neural network separately on a computer system, as has been described above, than to prepare the structure for each apparatus. Even if the fundamental portion is separately learned in advance, the learning function has to be realized on the apparatus in case it is desired to provide a function to correct the characteristics for each speaker. (Of course, it is more general and desirable to realize the studying function on a general-purpose processor for the control of the apparatus and by software rather than by the use of the same portion as the acoustic cue extraction processor of the apparatus and to load down each acoustic cue extraction processor after the learning.

The general procedures of the learning are described in detail on pp. 318 to 362, Vol. 1, Sec. 8, the aforementioned publication of D. E. Rumelhart. The present embodiment is devised to match the present object with reference to the procedures. For simplifying the following descriptions, the characteristics of the units of the individual layers expressed by (3) to (5) are equalized without losing the generalities, and the following formulas are made:

$$I_{p,q} = \Sigma w_{p-1,q,r} O_{p-1,r} \quad (6);$$

and $$O_{p,q} = f(I_{p,q}) \quad (7).$$

Here the letter p designates the layer number (p=1, 2, 3 and 4) from the input; the letter q designates the unit number of the p-th layer; and the letter r designates the unit number of the (p−1)th layer. Moreover, the letters $T_0$ designate the target value of the learning.

Figure 4:
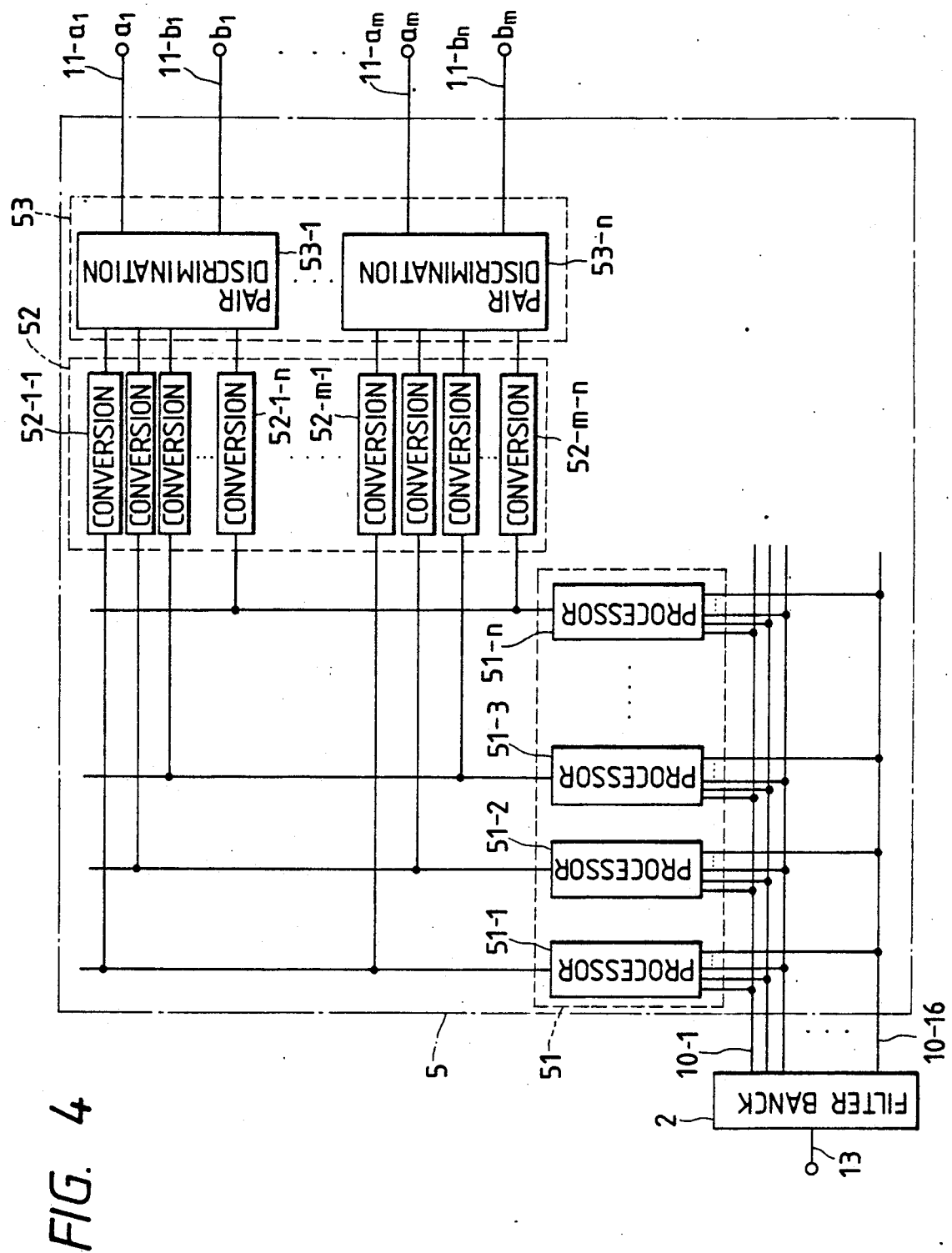
FIG. 4 is a diagram showing the structure of the pair discrimination unit.

Here, a number of learning sample speeches are prepared, and outputs through the filter bank 2 (as shown in FIG. 4) are extracted every ten milliseconds, at which the acoustic cues of FIG. 5 are visually featured or not. Now, in case the acoustic cue extraction processor for detecting the third fricativeness is to be studied, for example, the output of the filter bank 2 is added from the input of the same processor by using the speech thus prepared, and the learning target value $T_\theta$ is presented from the output side by "1" for the fricative and by "0" for the others. If an error between the output by the input signal of each unit and the target value given from the learning target is designated at δ, it is determined according to the aforementioned literature by:

For Output Layer:

$$\delta_{4,0} = (T_0 - T_0) f'(I_{4,0}) \quad (8);$$

and

For Third Layer:

$$\delta_{3,q} = f'(I_{3,q}) \cdot \delta_{4,0} w_{3,0,q} \quad (9).$$

Likewise, the error δ is determined up to the input layer. The correction Δw of the weight of each coupled portion is determined in the following manner by using that error:

$$\Delta w_{p-1,q,r} = \alpha \cdot \delta_{p,q} \cdot O_{p-1,r} \quad (10).$$

The value α may be set by examining the converging rate experimentally. Other acoustic cue extraction processors are also constructed to output the existence of the feature of each cue as a value within the range of [0, 1] by a similar learning of the cue. Thus, the acoustic cue extraction processors output the value "1" for complete features, the value "0" for incomplete features, and an intermediate value for other cases.

Figure 8:
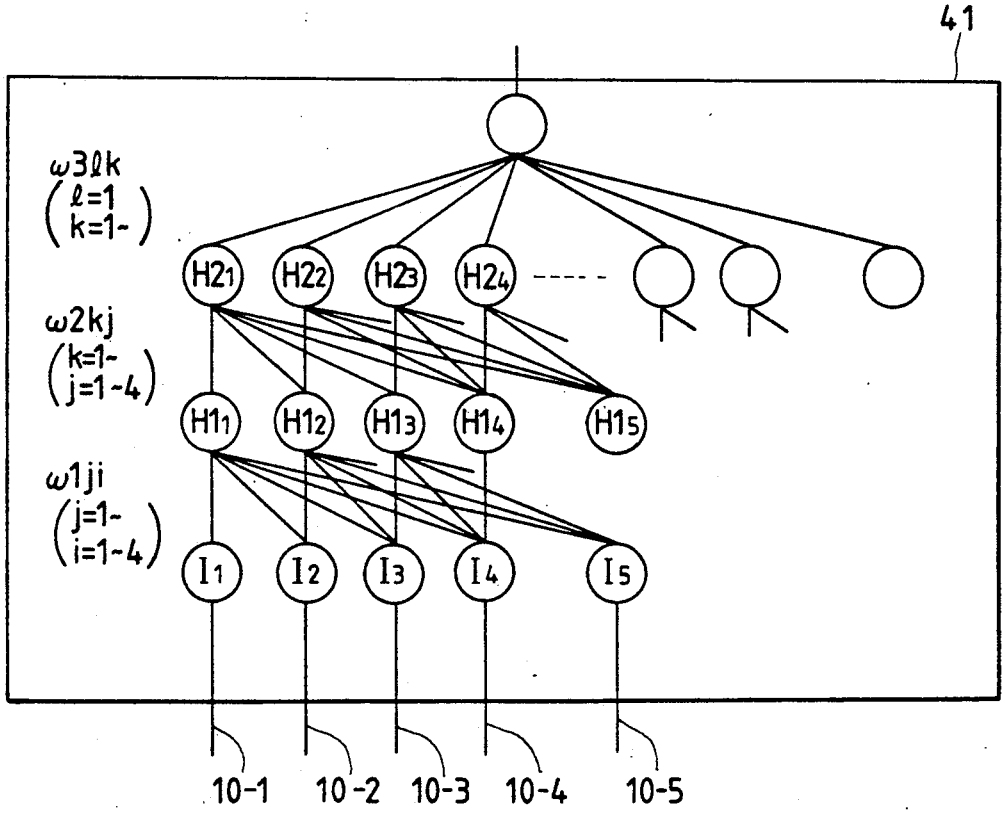
Figure 7:
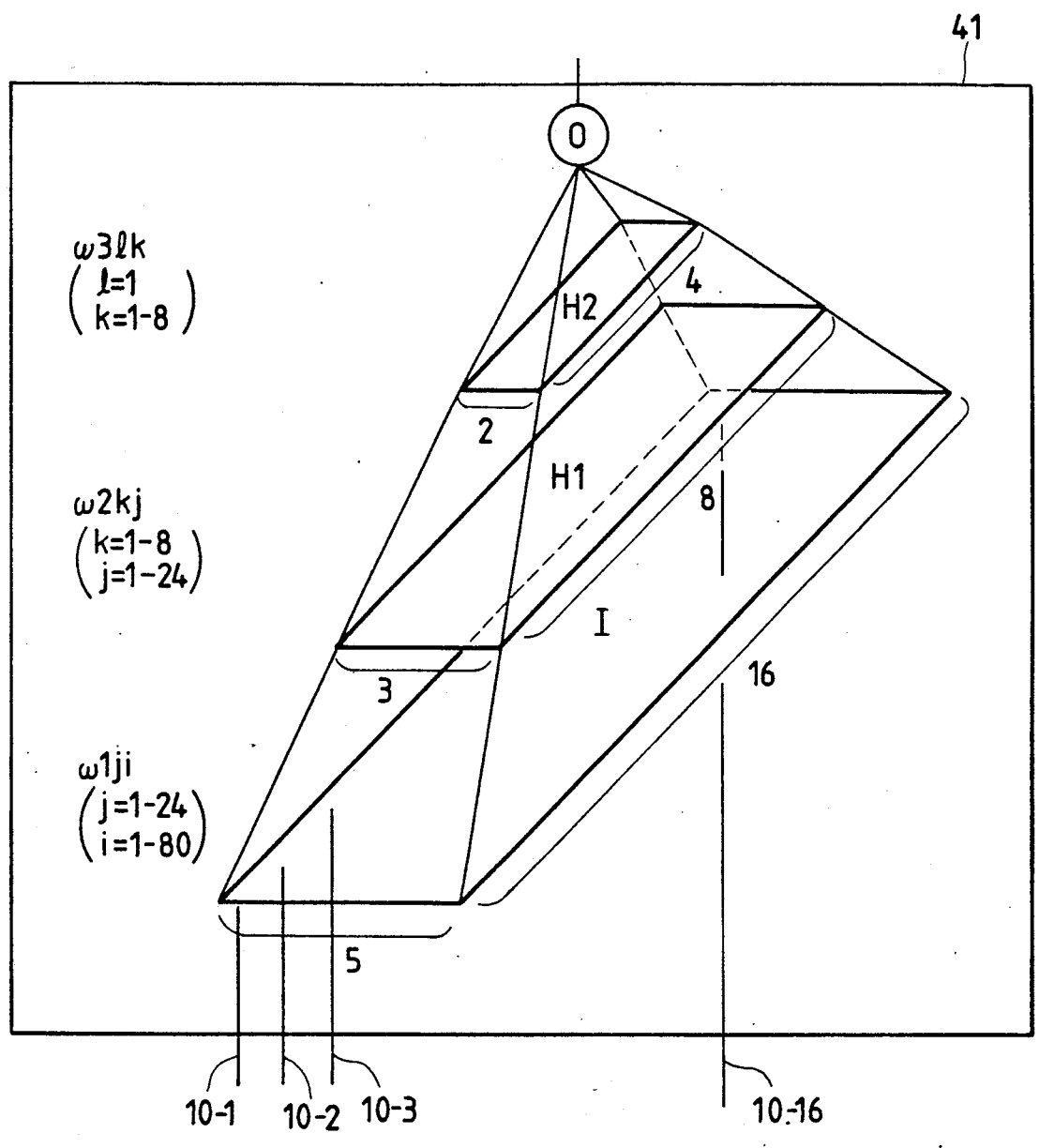

The acoustic cue extraction processors of the Types 2 and 3 are provided with the hierarchic neural networks having the structures shown in FIGS. 7 and 8, respectively.

The difference between the Types 2 and 1 resides in that the structure of each layer of the neural network is apparently two-dimensional. Although this two-dimensional arrangement is simply expressed in a plane for feasible illustration in FIG. 7, the units are arranged two-dimensionally in each plane. The connections of the individual layers are identical to those of the case of the Type 1 if the units in each layer are sequentially numbered from the end and are arranged in the same order in a row. Thus, the interlayer processings and the learning procedures are identical to those of the Type 1.

The difference inbetween resides in that the data inputs to the input layers are different. In FIG. 7, more specifically, the oblique sixteen units are connected directly with the outputs of the filter bank 2, and the data of the outputs of the filter bank of 10, 20,---, and 40 milliseconds before are inputted in the transverse direction. Thus, the outputs of the individual channels of the filter bank are connected to five-stage shift registers, the outputs of which are inputted to the first-layer unit. Since, however, the connections in the neural network are all equally coupled and since the degree of coupling is determined by the learning, the neural network has substantially the same structure as that of the Type 1 from the standpoint that all the outputs of 16×5=80 data of the filter bank of 40 milliseconds before are inputted.

The Type 3 is similar in the structure of the input data to the Type 2 but is different in the restrictions upon the coupling in the neural network. In order to illustrate this difference, FIG. 8 presents a portion of the section of a predetermined one-channel output portion of the filter bank output. As seen from FIG. 8, sixteen channels are arranged depthwise two-dimensionally. What is different from the Type 2 is the restriction on the connections of the layers. For example, a unit $HI_2$ is connected not to a unit $I_1$ but to units $I_2$ to $I_5$. A unit $HI_3$ is connected not to the units $I_1$ and $I_2$ but to the units $I_3$ to $I_6$. The units $I_1$, $I_2$, - - - , and so on are shifted from the outputs of the channels of the filter bank for every ten milliseconds so that only the data of the timely-shifted portion is coupled to the more significant layers. Except for this point, the Type 3 is absolutely similar to the Types 1 and 2. The learning procedures can be realized absolutely irrespective of the result of the Formula (10) except that the uncoupled units are always set at 0. Incidentally, the indications of the constant units for automatically learning the threshold values of the individual units are omitted from the illustrations of the Types 2 and 3, which can naturally be constructed like the Type 1.

For convenience of explanation, the pair discrimination units 53 will be described in the following prior to the transformation units 52.

The pair discrimination units 53 use the outputs of the grouped acoustic cue extraction processors to discriminate how likely the input speech is one of two phonemes "ai" and "bi" if it is assumed to be either /p/ or /k/. The information of using which acoustic cue is stored in the second memory 7 shown in FIG. 1. In case, therefore, the kinds of the phonemes contained in the speech of a language to be recognized are N, it is necessary to consider the pair discrimination units in the number of $n = {_N}C_2$ of the combination of all pairs. It is, however, needless to say that the combination of the phonemes will raise few errors practically or the pairs containing the phonemes having a low frequency of appearance will raise few problems so that the errors can be ignored.

In accordance with the information in the second memory 7 of FIG. 1, which one of the acoustic cue extraction processors j is to be used is perceived (by making the couplings of FIG. 4 in advance) to obtain the output $O_j$ of the acoustic cue used. In accordance with the table values of the transformation unit 52 of the second memory 7, as conceptionally shown in FIG. 9, all the acoustic cues using the values $\mu_{ai/bi,j}$ and $\mu_{bi/ai,j}$ indicating the certainties of the phonemes ai and bi are extracted to decide the fuzzy logic OR for each of the phonemes ai and bi so that the decided fussy logic OR is outputted as the pair decided result $\mu_{ai/bj}$ and $\mu_{bj/ai}$ of the phonemes ai and bi. These values are stored in related positions shown as the object positions in the Table of FIG. 10 The fuzzy logic OR is a processing for taking the maximum of the related membership functions and resorts to a method of selecting the most certain one of the related several acoustic cues.

If all the phonemic pairs are thus examined, there can be created a two-dimensional Table of the membership functions shown in FIG. 10. These values are the outputs of the pair discrimination unit 5. In this Table, the value $\mu_{p/t}$ is the membership function value expressing the certainty of the phoneme /p/ in case the input is assumed to be the phoneme /p/ or /t/.

Next, the result collection (or final decision) unit 8 shown in FIG. 1 will be described in the following.

The result collection unit 8 accomplishes the processing of deciding which of the input phonemes is the most certain from the values tabulated in FIG. 10. In the present embodiment, the fuzzy logic OR is taken from the individual rows of the matrix shown in FIG. 10 and is defined as a certainty corresponding to each row so that its maximum may decide the input phoneme. If the certainty of each phoneme is designated at $\mu_{ai}$, the present processing can be expressed by:

$$\mu_{ai} = \bigcup_{\substack{j=1 \\ j \neq 1}}^{n} \mu_{ai/bj}.$$

The category (or phoneme) giving the n-th value is accepted as the n-th recognition result. The fuzzy logic OR is identical to the processor for determining the minimum of the membership functions so that the processing selects the value which is judged for each pair to be the phoneme to some extent at the worst.

As has been described hereinbefore, according to the present embodiment, the processings of the pair discrimination pairs and the result collection unit 8 may be accomplished by remarkably simple algorithms and can be coped with using simple software.

Figure 11:
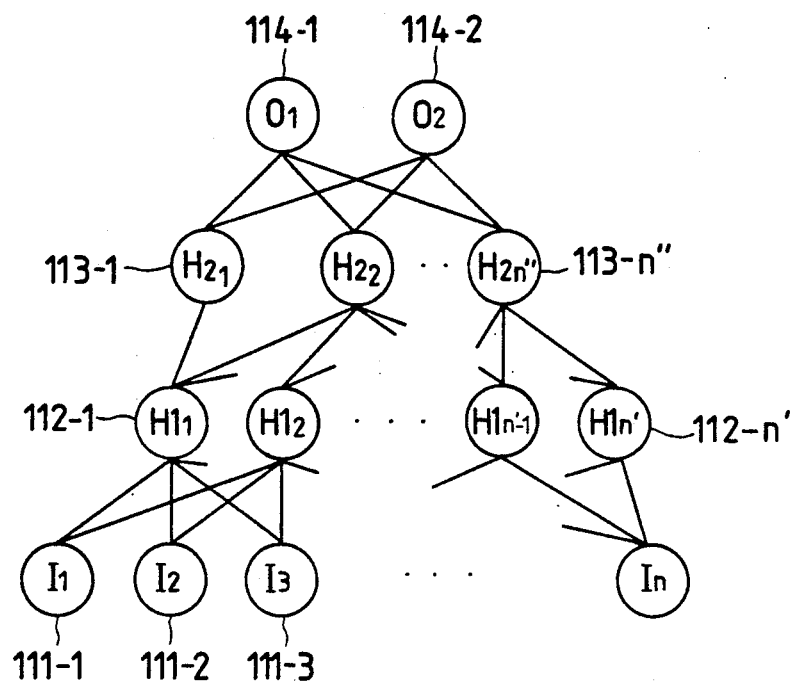
FIG. 11 is a diagram for explaining the case in which the pair discrimination unit is constructed of a neural network according to the second embodiment.

Next, a second embodiment will be described in the following. The second embodiment has an overall structure similar to that of the first embodiment such that the pair discrimination units 53 of the first embodiment shown in FIG. 4 are constructed of a neural network but do not include fuzzy processing. This neural network is shown in FIG. 11. If the outputs of the grouped acoustic cue extraction processors 51 or the transformation units 52 are inputted to input layers 111-1 to 111-n, the pair discrimination outputs (as designated at 11-ai and 11-bi in FIG. 4) are outputted from output layer units 114-1 and 114-2. The fundamental structure of the neural network is absolutely the same as that of the case of FIG. 6 but is different in that the output layers are constructed of two units corresponding to the pair discrimination performances. In case the phoneme ai is inputted as the study input, the study target value $T_{ai}$ of the output layer unit at the ai side is set at 1 whereas the study target value of the other output unit is set at 0. If the study input phoneme is bi, on the other hand, the setting is reversed. For either of the inputs ai and bi, the value 0 is set so that they may be studied like the case in which the neural network of FIG. 6 is studied. In case the input phonemes are the best match, a value near 1 is outputted from the outputs of the incident side. In the non-coincident case, a value near 0 is outputted.

Figure 12:
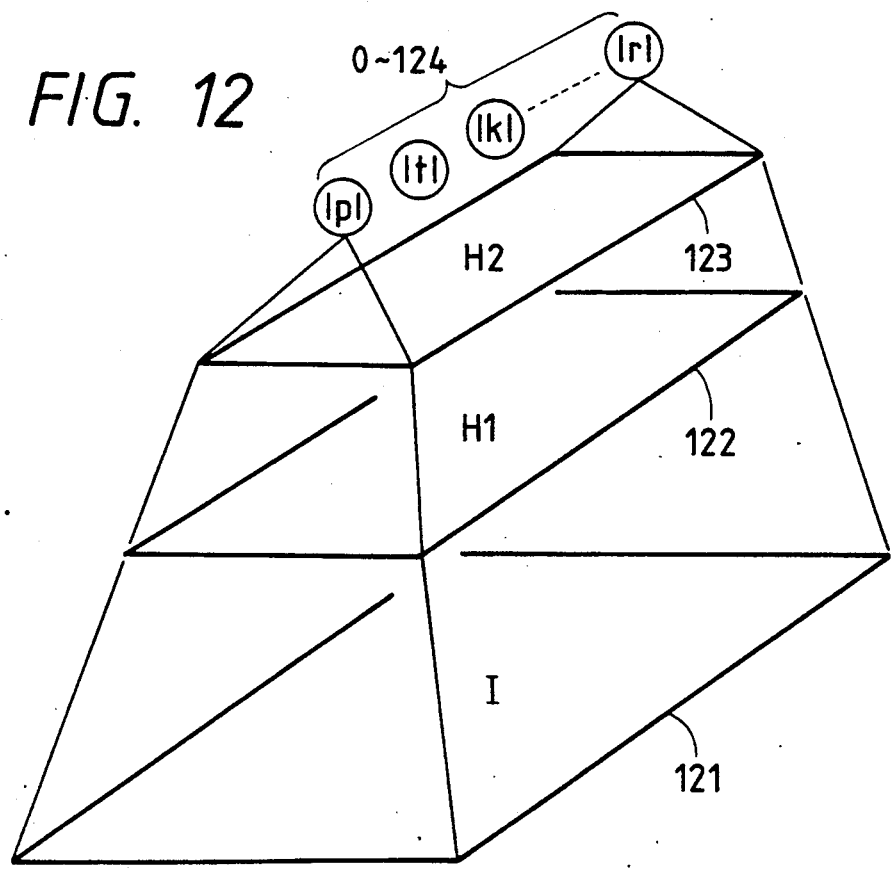
FIG. 12 is a diagram for explaining the case in which the synthetic discrimination unit is constructed of a neural network according to a third embodiment.

FIG. 12 shows a diagram for explaining a third embodiment. This embodiment is similar in its basic overall structure to the first embodiment but is different in that the result collection unit 8 of FIG. 1(a) is constructed of a neural network. The neural network of the present embodiment has each of its layers constructed apparently two-dimensionally such that an output layer 124 is composed of units corresponding to the number of the phonemes. To the individual units of an input layer 121, there is inputted the two-dimensional data of FIG. 10 or the outputs coming from the pair discrimination units of FIG. 4. Since all the units of the input layer 121 are coupled to the individual units of the second layer, the data can be substantially deemed as one-dimensional data like the first layer of FIG. 1. Likewise, the second and third layers are substantially made as a one-dimensional structure. For the study, the pair discrimination results of the input speech are inputted to the individual units of the input layer 121 so that the study target value of the units of the output layer 124 corresponding to the phonemes of the input speech may be set at 1 whereas the target value of the other units may be set at 0. Thus, the coupling weight may be studied in the procedures like those of the case in which the neural net of FIG. 6 is studied. When the study is completed, the output of the output unit to be presumed as the phoneme of the input speech, if any, is as close as 1. The category name corresponding to the unit for giving an n-th value near 1 can be deemed as the n-th recognition result.

Since the present invention has been constructed as described hereinbefore, it can attain the following effects.

Since the processing by the neural network or fuzzy processing is used, the ambiguity of the speech can be flexibly eliminated by the present invention to achieve a high recognition. Since, moreover, these processings are used in the logic structure of the pair discrimination type, the causes for an error can be easily discovered and coped with to accumulate improvements in the performances. Since, still moreover, an automatic studying function of the neural network is utilized, the processing suitable for each category can be automatically set to achieve a high recognition. Since, furthermore, each portion is constructed in advance in a structurally divided manner, it can be assembled and studied stably and easily to eliminate the difficulty in the study of the large-scaled neural network system.

What is claimed is:

1. A speech recognition apparatus comprising:
   input means for inputting speech;
   feature extraction means for extracting feature vectors from the input speech in each of a series of predetermined times and for obtaining a feature vector series;
   candidate selection means for selecting high-ranking candidates of recognition result by matching the feature vector series with various categories;
   pair generation means for generating a plurality of pairs of candidates from the candidates selected by said candidate selection means;
   pair discrimination means for discriminating between each candidate of each pair of selected candidates, wherein said pair discrimination means comprises neural network means for extracting several acoustic cues specific to a respective pair from the feature vector series, said neural network means having respectively suitable structures for extracting the several acoustic cues by setting up connection coefficients based on information stored in a first memory, and logic means for selecting the most certain one of the several acoustic cues based on extracted results of said neural network means; and decision means for ranking the selected candidates based on a pair discrimination result of said pair discrimination means, thereby representing which candidate of the selected candidates corresponds to the input speech.

2. A speech recognition apparatus according to claim 1, further comprising a first memory for storing connection coefficients of said neural network means to be set up in order to extract the several acoustic cues specified to the respective pair of the selected candidates.

3. A speech recognition apparatus according to claim 1, further comprising membership function calculation means for transforming the extracted results of said neural network means into membership function values, wherein said logic means selects the most certain one of the several acoustic cues based on the transformed membership function value.

4. A speech recognition apparatus according to claim 3, wherein said logic means comprises a fuzzy logic OR device for determining for each pair of selected candidates the maximum of the transformed membership values.

5. A speech recognition apparatus according to claim 3, further comprising membership function calculation means for transforming the extracted results of said neural network means into membership function values, wherein said logic means selects the most certain one of the several acoustic cues based on the transformed membership function value.

6. A speech recognition apparatus according to claim 5, wherein said logic means comprises a neural network for determining for each pair of the selected candidates the maximum of the transformed membership function values.

7. A speech recognition apparatus according to claim 3, wherein said logic means comprises a fuzzy logic OR device for determining for each pair of the selected candidates the maximum of the transformed membership values.

8. A speech recognition apparatus according to claim 1, wherein said logic means comprises a neural network for determining for each pair of the selected candidates the maximum of the transformed membership values.

9. A speech recognition apparatus comprising:
input unit inputting speech and converting the input speed into a digital signal;
a spectral analysis unit for extracting feature vectors from the digital signal of the input speech in each of a series of predetermined times and for obtaining a feature vector series;
a candidate selection unit for selecting high-ranking candidates of various phonemes by matching the feature vector series with the various phonemes;
a pair generator for generating a plurality of pairs of candidates from the candidates selected by said candidate selector;
a pair discrimination unit for discriminating between each candidate of each pair of selected candidates, wherein said pair discrimination unit comprises neural networks for extracting several acoustic cues specific to the respective pair from the feature vector series, said neural networks having respectively suitable structures for extracting the several acoustic cues by setting up connection coefficients based on information stored in a first memory, and a fuzzy logic unit for selecting the most certain one of the several acoustic cues based on extracted results of said neural networks; and
a decision unit ranking the selected candidates based on pair discrimination results of said pair discrimination unit, thereby representing which candidate of the selected candidates corresponds to the input speech.

10. A speech recognition apparatus according to claim 9, further comprising a membership function calculation unit for transforming the extracted results of said neural networks into membership function values.

11. A speech recognition apparatus according to claim 10, wherein said fuzzy logic unit comprises a fuzzy OR device for determining for each pair of the selected candidates the maximum of the transformed membership function values.

12. A speech recognition apparatus according to claim 11, wherein said decision unit comprises a fuzzy logic AND device for summing the transformed membership function values for each of the selected candidates and for ranking the selected candidates based on its summation result.

* * * * *